United States Patent [19]

Fassauer

[11] Patent Number: 5,117,619

[45] Date of Patent: Jun. 2, 1992

[54] AIR-FLOATED APPARATUS WITH CENTRIFUGE RACEWAY

[76] Inventor: Arthur L. Fassauer, P.O. Box 124, Canyon, Tex. 79015

[21] Appl. No.: 680,787

[22] Filed: Apr. 3, 1991

Related U.S. Application Data

[63] Continuation-in-part of Ser. No. 587,678, Sep. 25, 1990, abandoned, which is a continuation-in-part of Ser. No. 528,718, May 24, 1990, abandoned.

[51] Int. Cl.$^5$ .............................................. A01D 34/00
[52] U.S. Cl. ................................. 56/12.8; 56/DIG. 3
[58] Field of Search ................ 56/1, 12.8, 101, 320.1, 56/320.2, DIG. 8, DIG. 3

[56] References Cited

U.S. PATENT DOCUMENTS

| | | | |
|---|---|---|---|
| 3,838,558 | 10/1974 | Goodchild | 56/12.8 |
| 4,245,455 | 1/1981 | Martin | 56/12.8 |
| 4,245,456 | 1/1981 | Ziptel | 56/12.8 |
| 4,527,380 | 7/1985 | Fushiya et al. | 56/12.8 |

FOREIGN PATENT DOCUMENTS

| | | | |
|---|---|---|---|
| 1534021 | 11/1978 | United Kingdom | 56/12.8 |
| 2028089 | 3/1980 | United Kingdom | 56/12.8 |

Primary Examiner—William P. Neuder
Attorney, Agent, or Firm—Ross, Howison, Clapp & Korn

[57] ABSTRACT

The present invention describes an air-floated apparatus comprising a wheel-less housing having a skirt extending around a lower edge thereof and having an air-inlet opening in an upper portion thereof, the housing further including a discharge port. The apparatus includes a motor having a rotatable shaft. An impeller is mounted on the shaft for generating pressurized air in the hosuing to float the housing above a support surface. The apparatus also includes a cutting blade mounted on said shaft for generating grass clippings. According to the invention, a substantially u-shaped centrifuge raceway is provided for receiving the grass clippings and transporting the grass clippings to the discharge port. A plurality of struts are provided for supporting the centrifuge raceway in a spaced relationship with respect to an inner wall of the housing to create an air pressure channel for the pressurized air between the inner wall and the centrifuge raceway. Preferably, the centrifuge raceway includes an anti-stick coating on its inner surface to facilitate movement of the grass clippings towards the discharge port.

6 Claims, 3 Drawing Sheets

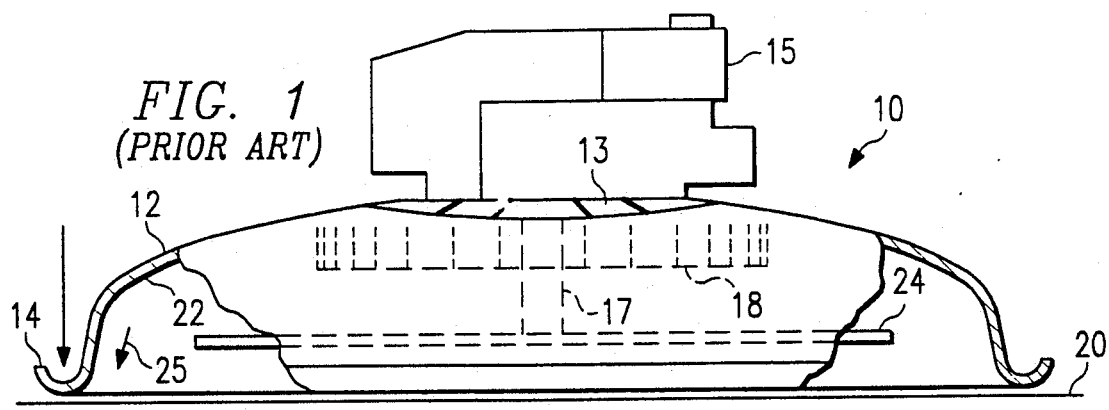
FIG. 1 (PRIOR ART)
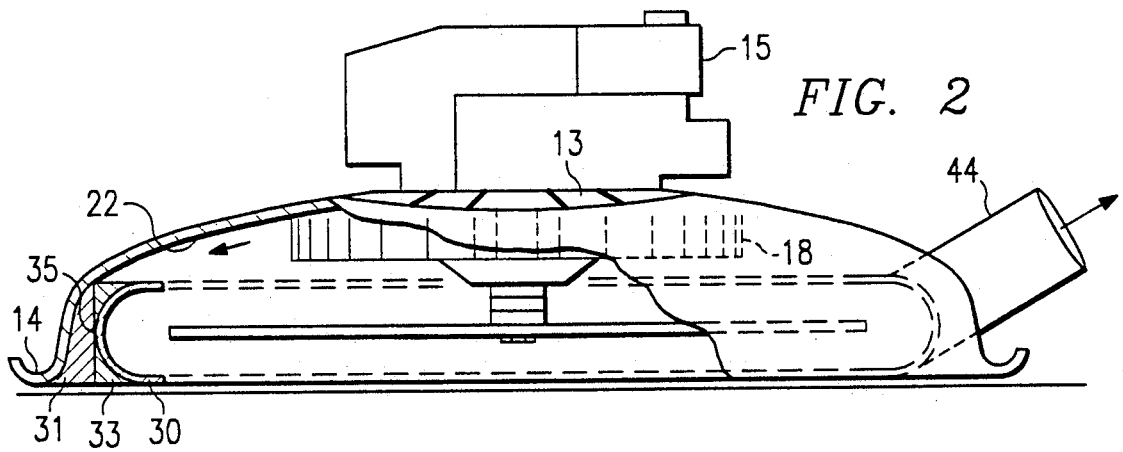
FIG. 2A
FIG. 2
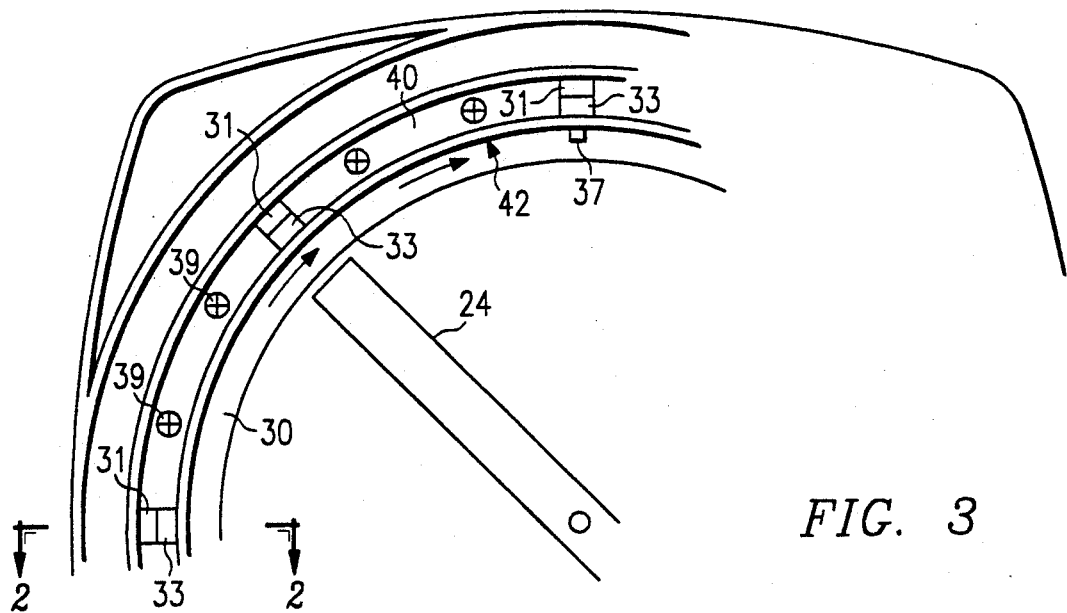
FIG. 3

AIR-FLOATED APPARATUS WITH CENTRIFUGE RACEWAY

This application is a continuation-in-part of prior copending application Ser. No. 07/587,678, filed Sept. 25, 1990, now abandoned, which is a continuation-in-part of prior copending application Ser. No. 07/528,718, filed May 24, 1990, now abandoned.

TECHNICAL FIELD

The present invention relates generally to an air-floated apparatus, such as a lawn mower, that floats on an air cushion during operation and that includes an internal raceway or module for centrifuging grass clippings efficiently to a discharge port.

BACKGROUND OF THE INVENTION

It is known in the prior art to provide an apparatus, such as a lawn mower, which is air-supported and thus does not require ground wheels and axles and other parts normally used for supporting the apparatus on the ground. Generally, such devices include a substantially-enclosed housing and means for generating air pressure within the housing to provide an air cushion to float the housing over a support surface. Examples of such devices are shown in U.S. Pat. Nos. 3,170,276, 3,293,836 and 4,245,455, and U.K. Patent Specification No. 1,534,021.

While air-floated devices of the prior art have significant advantages over conventional wheeled products, such devices have certain inherent problems which have yet to be overcome. In particular, such devices typically include an outer housing having a narrow peripheral edge, bezel or seal. During operation, air blown toward the ground by the air pressure means tends to escape from the housing between the ground an the narrow edge structure, which substantially reduces the lifting force on the housing. The rapid escape of air along the periphery of the mower housing also stirs up dust and debris when mowing around shrubbery and the like, which makes mowing difficult and hazardous. Also, because the air is blown downward to keep the housing afloat, the air pressure depresses the grass, causing the cutting blade to leave an uneven cut. Other problems include the inability to maintain lateral or side-to-side stability of the device.

Perhaps the greatest disadvantage of prior art air-cushioned mowers is their inability to discharge grass cuttings, which leaves a windrow of cuttings that must be raked up after mowing. Conventional lawn mowers tend to vacuum up grass by the rotary action of the cutting blade. In prior art air-cushioned mowers, however, downwardly blown air pressure used to create the lifting force by ground effect is not sufficient to effectively discharge grass cuttings. In other words, prior art air-cushioned mowers have not been able to maintain flotation while simultaneously discharging grass clippings from a port.

It would therefore be desirable to provide an improved air-floated apparatus that overcomes these and other problems associated with the prior art.

BRIEF SUMMARY OF THE INVENTION

It is an object of the present invention to provide an air-floated apparatus, such as a lawn mower, that floats on an air cushion during operation.

It is still a further object of the invention to describe an air-floated apparatus that is simple to construct, has few moving parts and which is easy to maintain.

It is an object of the invention to provide an air-floated apparatus that includes a novel centrifuge raceway or chamber that facilitates positive directional channeling of grass clippings and/or other particulate matter to a discharge duct of the apparatus.

It is still another object of the invention to provide an air-floated apparatus that has improved stability and gliding maneuverability.

It is yet a further object to use a centrifuge raceway in an air-floated apparatus to efficiently transport particulate matter to a discharge duct of the apparatus for collection.

It is another object of the invention to provide an air-cushioned lawn mower in which the channeling of air pressure for flotation is separated from the cutting of grass to facilitate efficient transport of particulate material to a discharge port of the mower.

It is a still further object of the invention to provide an air-cushioned lawn mower having a centrifuge raceway wherein pressurized air is channeled between the raceway and an inner wall of the mower housing in a downward direction to minimize air leakage from the housing and thus maximize lift.

Another object of the invention is to provide an air-cushioned lawn mower having a centrifuge raceway wherein the pressurized air that is channeled inwardly along the bottom of the housing helps to stand up the grass underlying the housing prior to cutting to enable the mower to provide a smooth, even cut.

These and other objects of the invention are provided in an air-floated apparatus comprising a wheel-less housing having a skirt extending around a lower edge thereof and having an air-inlet opening in an upper portion thereof, the housing further including a discharge port. The apparatus includes a motor having a rotatable shaft. An impeller is mounted on the shaft for generating pressurized air in the housing to float the housing above a support surface. The apparatus also includes a cutting blade mounted on said shaft for generating grass clippings. According to the invention, a substantially u-shaped centrifuge raceway is provided for receiving the grass clippings and transporting the grass clippings to the discharge port. In one embodiment, a plurality of struts are provided for supporting the centrifuge raceway in a spaced relationship with respect to an inner wall of the housing to create an air pressure channel for the pressurized air between the inner wall and the centrifuge raceway. Preferably, the centrifuge raceway includes an anti-stick coating on its inner surface to facilitate movement of the grass clippings towards the discharge port. Alternatively, the centrifuge raceway includes a replaceable snap-in module having the anti-stick coating or material on its inner surface. The snap-in module can also be molded entirely out of the anti-stick material. The snap-in module is removable for cleaning and/or replacement.

The centrifuge raceway can be supported within the housing in other ways. For example, a plurality of molded support bosses, spaced at approximately 30 degree intervals, are molded to the inner wall of the housing. A plurality of mating bosses, secured to or molded with an outer wall of the raceway, are then aligned with the plurality of support bosses of the housing. Each of the boss pairs are then secured together by screws, adhesive or other suitable fasteners. In yet another embodiment, the struts can be molded as part of the housing itself to increase the monolithic strength of the housing and simplify manufacturing.

In an alternate embodiment, the air-floated or "hover" type apparatus of the invention includes a cutting blade rotatable on a shaft for generating grass clippings and for throwing the grass clippings outwards as the cutting blade rotates, the cutting blade having a tip exhibiting a tip speed for creating a directional air current as the cutting blade rotates. The apparatus is floated using a means for establishing an air cushion. A centrifuge raceway is supported in a spaced relationship from an inner wall of the apparatus housing to create an air pressure channel between the inner wall and the centrifuge raceway through which the air cushion is directed downward to float the housing, the centrifuge raceway receives the grass clippings thrown outward by the cutting blade as the cutting blade rotates. In operation, the directional air current created by the cutting blade tip speed transports said grass clippings to the discharge port. The raceway thus substantially isolates the air pressure used to float the apparatus from the directional air flow pattern. If desired, the centrifuge raceway includes at least one louvered slit therein to enable the pressurized air used to float the housing to bleed back into the raceway and thus increase the directional air current. This facilitates transportation of the clippings to the delivery port.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 1 is a sectional view of an air-floated apparatus of the prior art;

FIG. 2 is a sectional view of a novel air-floated apparatus according to the teachings of the present invention; and FIG. 2A is a sectional view of a snap-in module for use with the centrifuge raceway of FIG. 2;

FIG. 3 is a plan view of the apparatus of FIG. 2;

Similar reference characters refer to similar parts throughout the several views of the drawings.

DETAILED DESCRIPTION

Figure 4:
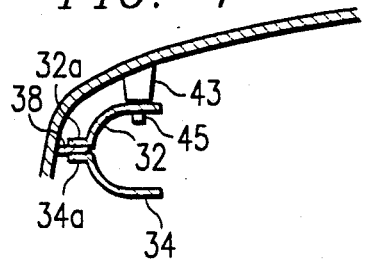
FIG. 4 is a detailed view of a portion of another embodiment of the invention for securing the centrifuge raceway to the inner wall of the housing.

Referring now to FIG. 1, a simplified view is shown of a prior art air-floated apparatus 10 for use as a rotary lawn mower. Air-floated apparatus 10 includes a wheelless housing 12 having a skirt 14 extending around the lower edge thereof. The housing 12 has a plurality of air inlet openings 13 in the upper portion thereof. A motor 15 is disposed above the housing 12 and includes a rotatable shaft 17 extending therethrough. An impeller 18 is supported on the shaft for rotation therewith for pressurizing air to float the apparatus above a support surface 20. In particular, pressurized air generated by the impeller 18 is generally forced along the inner wall 22 of the housing and downwards toward the skirt as indicated by arrows 25. A cutting blade 24, for cutting the grass, is supported on the shaft 17 for common rotation with the impeller 18.

One of the shortcomings of the air-floated apparatus 10 of FIG. 1 is that cut grass clippings are not readily transportable to a delivery or discharge port 29 of the housing. Accordingly, such clippings tend to either remain on the support surface 20 or medium to tall grass clippings build up under the housing. Since prior art air-cushioned mowers have no effective means to deliver grass through a port while maintaining flotation, this build up leaves a constant window of clippings, which then needs to be raked following mowing. According to the present invention, this problem is overcome through use of a novel centrifuge raceway 30 that preferably extends around substantially all of the inner wall 22 of the housing 12. As seen in FIGS. 2 and 3, the centrifuge raceway 30 is substantially u-shaped. A plurality of support bosses 31, spaced at approximately 30 degree radial increments, are molded to the inner wall 22 of the housing. A plurality of mating bosses 33 are secured to or molded with an outer wall 35 of the raceway. The boss pairs, each comprising a boss 31 and a boss 33, are then aligned as shown in FIG. 3. Each of the boss pairs are then secured together by screws 37 or some other suitable fasteners such as adhesive or the like to secure the raceway within the housing. The bosses may include locator tongues and grooves to facilitate alignment.

An air pressure channel or slot 40 is thus created between the inner wall 22 of the housing and the centrifuge raceway 30. Pressurized air generated by the impeller 18 is forced downward, as indicated by arrows 39, through the air pressure channel 40 to float the housing above the support surface. In particular, the air pressure is directed downwardly and is then concentrated under the bottom side of the raceway 30 and the bottom side of a widened skirt 14 to create a thin sandwich of air for added lift. Grass clippings generated by the cutting blade 26 are thrown against the inner surface 42 of the centrifuge raceway by the force of the rotating cutting blade, where they are transported around the raceway to a discharge port 44. The clippings are transported by the secondary air flow created by the tip of the cutting blade rotating adjacent the raceway. As seen in FIG. 2, the blade 24 is effectively isolated from the outer periphery of the housing for added safety.

Preferably, the inner surface 42 of the centrifuge raceway is coated with an anti-stick coating, such as TEFLON ® or the like, for increasing the acceleration of the clippings being centrifuged. Alternatively, as shown in FIG. 2A, a snap-in module 39 can be removably supported in the raceway and thus easily replaced or removed for cleaning. The inner surface 41 of the snap-in module 39 is then treated with the anti-stick coating. In either case, the raceway provides a positive directional channeling force to facilitate the movement of the clippings directly to the discharge port and thus out of the housing.

Referring now to FIG. 4, an alternate embodiment of the invention is shown. In this embodiment, the centrifuge raceway is again substantially u-shaped and includes an upper portion 32 and a lower portion 34. The upper portion includes a flange 32a and the lower portion includes a flange 34a. A plurality of struts 38 are located on the inner wall 22 at preferably 30 degree intervals. The struts 38 are preferably mounted by welding or other fastener means; alternatively, the struts are molded with the housing. The raceway 30 is then supported on the plurality of struts 38 as shown. If desired, a plurality of support bosses 43 can be molded with and spaced around the inner wall of the housing 22. The raceway 30 is then additionally secured to the support bosses by suitable fasteners 45. This construction provides additional support for the raceway within the housing.

Figure 5:
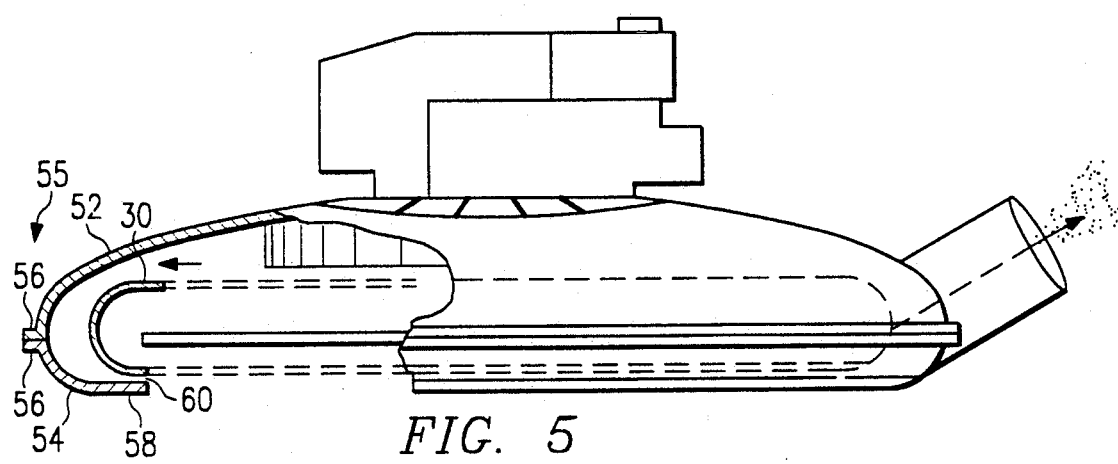
FIG. 5 is a sectional view of yet another embodiment of the invention.
Figure 6:
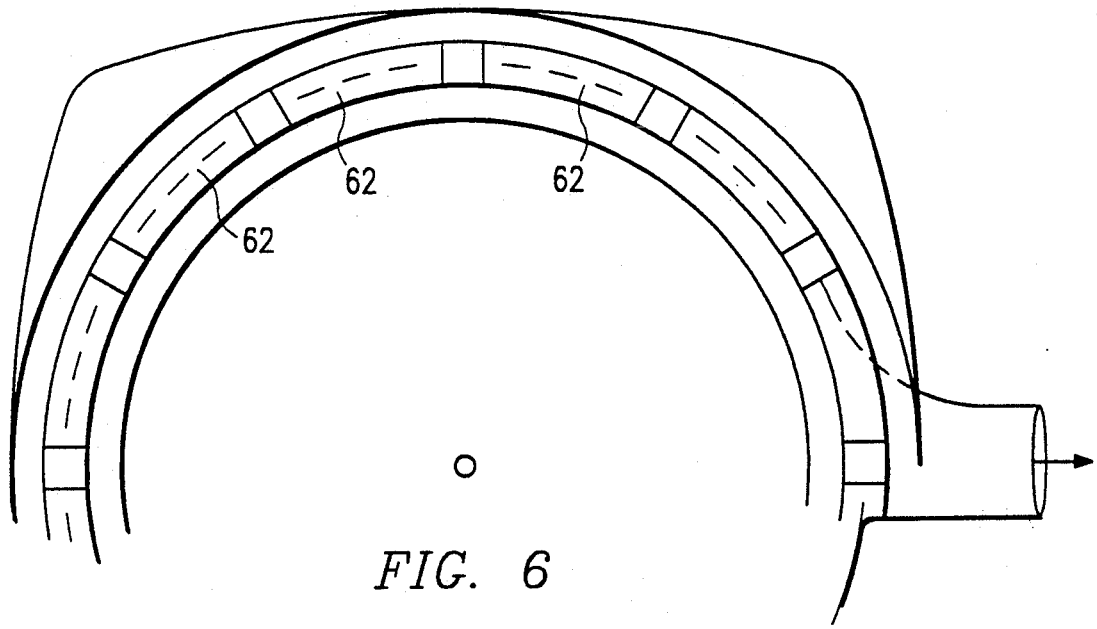
FIG. 6 is a plan view of the apparatus of FIG. 5.

Referring now to FIGS. 5-6, yet another embodiment of the invention is shown wherein the housing 12 includes top and bottom molded sections 52 and 54 separated by a molding parting line 55. Each of the sections includes a mating flange 56, which flanges are secured together by suitable fasteners spaced around the periphery. In this embodiment, the bottom section 54 includes an integral plate member 58 upon which the centrifuge raceway 30 is mounted or otherwise secured along an inner edge 60 of the member. Alternatively, the raceway 30 is molded with the bottom section 54. As best seen in FIG. 6, a plurality of channels or slots are cut-out of the plate member 58 to enable air pressure to be channeled in and through the slots. In this embodiment, pressurized air is channeled through the slots between the raceway and an inner wall 22 of the housing in a downward direction to create an air sandwich under the plate member to maximize lift. The pressurized air helps to stand up the grass underlying the housing prior to cutting to enable the mower to provide a smooth, even cut.

Accordingly, the present invention advantageously describes an air-floated or "hover" type of apparatus in which a cutting blade rotates on a shaft for generating grass clippings and throws the grass clippings outwards as the cutting blades rotates. The cutting blade has a tip exhibiting a tip speed for creating a directional air current as the cutting blade rotates. The apparatus further includes a centrifuge raceway supported in a spaced relationship from an inner wall of the apparatus housing to create an air pressure channel between the inner wall and the centrifuge raceway through which pressurized air is directed downward to float the housing. The centrifuge raceway receives the grass clippings thrown outward by the cutting blade as the cutting blade rotates, wherein the directional air current created by the cutting blade tip speed transports said grass clippings to the discharge port.

Figure 7:
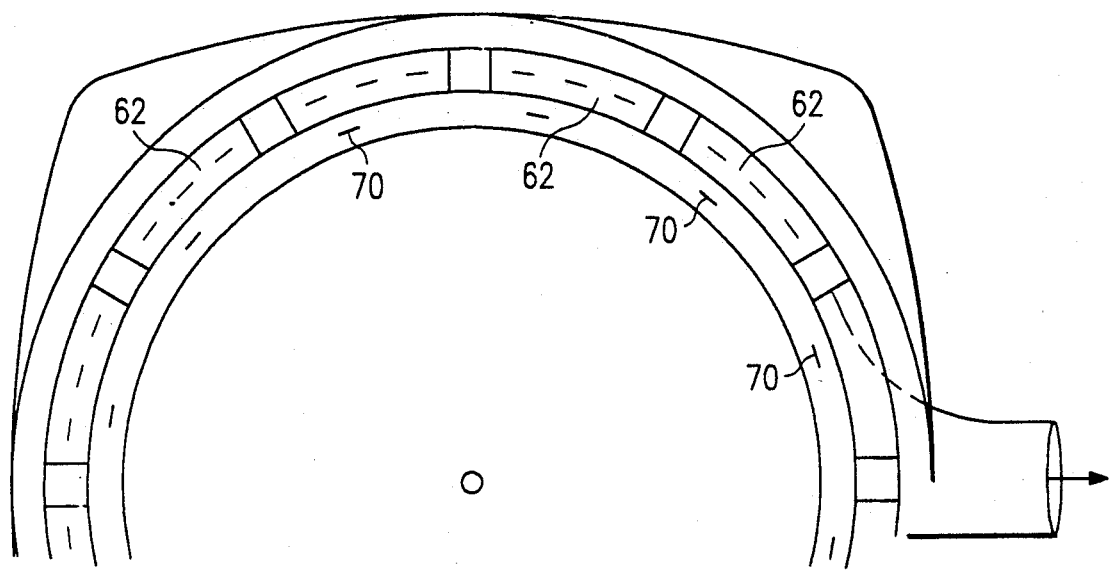
FIG. 7 is a plan view of an alternate embodiment of the invention wherein the centrifuge raceway includes one or more louvered slits to enable the air cushion to bleed back into the raceway.
Figure 7A:
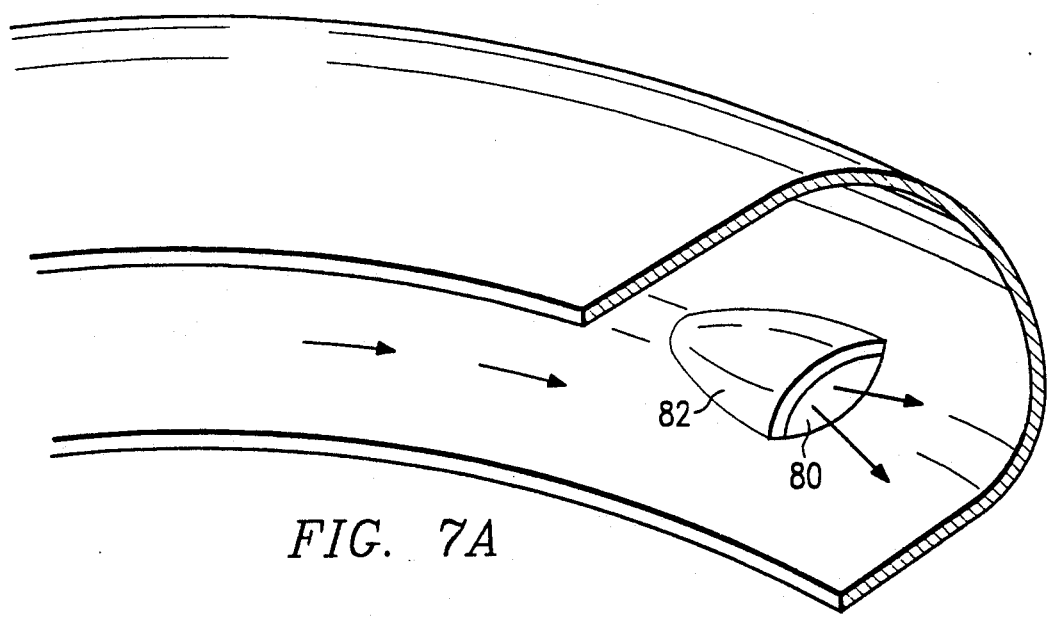
FIG. 7A is a perspective view of one of the louvered slits of FIG. 7

According to an alternate embodiment of the invention shown in FIG. 7, the centrifuge raceway has at least one louvered air slit 70 formed in a predetermined lower portion thereof. This louvered slit advantageously allows some of the pressurized air used to float the housing to "bleed" back into the raceway itself to increase the directional air current generated by the tip speed of the rotating blade. The minimal amount of the air pressure bled back into the raceway does not adversely affect flotation. The louver portion (or other cover) of the slit protects the opening from clogging and the use of the slit insures that the air is directed along the inner wall of the raceway. Preferably, several of the louvered slits 70 are selectively positioned about the circumference of the raceway as best seen in FIG. 7. The preferred louvered slit structure is shown in FIG. 7A and includes the slit itself 80 and the louver 82.

It should be appreciated by those skilled in the art that the specific embodiments disclosed above may be readily utilized as a basis for modifying or designing other structures for carrying out the same purposes of the present invention. For example, while the invention has been described in the context of an air-floated lawn mower, the centrifuge raceway can likewise be incorporated into other types of air-floated devices such as an air-floated vacuum cleaner for suctioning particulate matter and the like from a carpet. It should further be realized by those skilled in the art that such equivalent constructions do not depart from the spirit and scope of the invention as set forth in the appended claims.

What is claimed is:

1. An air-floated apparatus, comprising:
   a wheel-less housing having an air-inlet opening in an upper portion thereof, the housing having a bottom plate member including a plurality of spaced cutout portions and further including a discharge port;
   a motor including a rotatable shaft;
   an impeller mounted on said shaft for generating pressurized air in the housing, the pressurized air being directed in a downward direction to float the housing above a support surface;
   a cutting blade rotatable on said shaft for generating grass clippings and throwing the grass clippings outwards as the cutting blade rotates; and
   a substantially u-shaped centrifuge raceway receiving the grass clippings thrown outward by the cutting blade as the blade rotates and transporting said grass clippings to the discharge port; and
   wherein the bottom plate member supports the centrifuge raceway in a spaced relationship with respect to an inner wall of the housing to create an air pressure channel between the inner wall and the centrifuge raceway through which the pressurized air is directed downward and then through the spaced cutout portions of the bottom plate member to float the housing.

2. The air-floated apparatus as described in claim 1 wherein the centrifuge raceway includes an anti-stick material on its inner surface to facilitate movement of the grass clippings towards the discharge port.

3. The air-floated apparatus as described in claim 1 wherein the centrifuge raceway includes an anti-stick coating on its inner surface to facilitate movement of the grass clippings towards the discharge port.

4. The air-floated apparatus as described in claim 1 wherein the means for supporting the centrifuge raceway is a plurality of struts located at spaced intervals along the inner wall of the housing.

5. An air-floated apparatus, comprising:
   a wheel-less housing having a lower edge thereof and having an air-inlet opening in an upper portion thereof, the housing further including a discharge port;
   a motor including a rotatable shaft;

means for establishing a cushion of air to float the housing above a support surface;

a cutting blade rotatable on said shaft for generating grass clippings and throwing the grass clippings outwards as the cutting blade rotates, the cutting blade having a tip exhibiting a tip speed for creating a directional air current as the cutting blade rotates; and a centrifuge raceway supported in a spaced relationship from an inner wall of the housing to create an air pressure channel between the inner wall and the centrifuge raceway through which the air cushion is directed downward to float the housing, the centrifuge raceway receiving the grass clippings thrown outward by the cutting blade as the cutting blade rotates, wherein the directional air current created by the cutting blade tip speed transports said grass clippings to the discharge port;

wherein the centrifuge raceway includes at least one louvered air slit for enabling a portion of the air cushion to flow back into the raceway to increase the directional air current.

6. In an air-floated cutting apparatus comprising a housing having a discharge port, a motor, a cutting blade driven by the motor, and an impeller driven by the motor for establishing an air cushion to float the housing above a support surface, the improvement comprising:

a bottom plate member extending from the housing and including a spaced cutout portion through which pressurized air is directed through to float the housing; and structural means supported by the bottom plate member, the structural means receiving grass clippings thrown outward by the cutting blade as the cutting blade rotates and transporting the grass clippings to the discharge port.

* * * * *